United States Patent
Makinouchi et al.

(10) Patent No.: US 8,710,425 B2
(45) Date of Patent: Apr. 29, 2014

(54) ENCODER THAT OPTICALLY DETECTS POSITIONAL INFORMATION OF A MOVING BODY FROM DIFFERENT OPTICAL PATHS LENGTHS

(75) Inventors: Susumu Makinouchi, Zama (JP); Akihiro Watanabe, Sendai (JP)

(73) Assignee: Nikon Corporation, Tokyo (JP)

( * ) Notice: Subject to any disclaimer, the term of this patent is extended or adjusted under 35 U.S.C. 154(b) by 172 days.

(21) Appl. No.: 13/090,659

(22) Filed: Apr. 20, 2011

(65) Prior Publication Data

US 2011/0192964 A1 Aug. 11, 2011

Related U.S. Application Data

(63) Continuation of application No. PCT/JP2009/005513, filed on Oct. 21, 2009.

(30) Foreign Application Priority Data

Oct. 23, 2008 (JP) .................................. 2008-273166

(51) Int. Cl.
*G01D 5/34* (2006.01)

(52) U.S. Cl.
USPC ................... 250/231.13; 250/231.14; 341/13; 356/616; 356/617

(58) Field of Classification Search
USPC ........... 250/231.13–231.18; 341/13; 356/616, 356/617
See application file for complete search history.

(56) References Cited

U.S. PATENT DOCUMENTS

| | | | |
|---|---|---|---|
| 5,126,562 A * | 6/1992 | Ishizuka et al. | 250/231.14 |
| 6,005,667 A * | 12/1999 | Takamiya et al. | 356/499 |
| 6,639,686 B1 | 10/2003 | Ohara | |
| 7,046,368 B2 * | 5/2006 | Holzapfel et al. | 356/488 |
| 2007/0057168 A1 | 3/2007 | Imai | |
| 2007/0267571 A1 | 11/2007 | Makinouchi et al. | |

FOREIGN PATENT DOCUMENTS

| | | |
|---|---|---|
| EP | 1 826 535 A1 | 8/2007 |
| JP | 2006-170899 | 6/2006 |
| JP | 2007-333722 | 12/2007 |
| WO | WO 2006/064801 A1 | 6/2006 |

OTHER PUBLICATIONS

International Search Report dated Jan. 19, 2010 in International Application No. PCT/JP2009/005513 (with translation).
Written Opinion of the International Searching Authority dated Jan. 19, 2010 in International Application No. PCT/JP2009/005513 (with translation).
Aug. 31, 2012 Office Action issued in Chinese Patent Application No. 200980141928.9 (with translation).
Sep. 10, 2013 Office Action issued in Japanese Patent Application No. 2010-534690 (with translation).
Sep. 26, 2013 Office Action issued in Chinese Patent Application No. 200980141928.9 (with translation).

* cited by examiner

*Primary Examiner* — Seung C Sohn
*Assistant Examiner* — Kevin Wyatt
(74) *Attorney, Agent, or Firm* — Oliff PLC

(57) ABSTRACT

An encoder emits modulated light from a light source section and lets a first light and a second light separated from the modulated light interfere with each other in a moving grating. In the encoder, the light emitted from the light source section is electrically modulated, and the first light and the second light have different light path lengths.

15 Claims, 8 Drawing Sheets

ENCODER THAT OPTICALLY DETECTS POSITIONAL INFORMATION OF A MOVING BODY FROM DIFFERENT OPTICAL PATHS LENGTHS

CROSS-REFERENCE TO RELATED APPLICATION

This is a Continuation Application of International Application No. PCT/JP2009/005513, filed Oct. 21, 2009, which claims priority to Japanese Patent Application No. 2008-273166 filed on Oct. 23, 2008, the contents of which are hereby incorporated by reference in their entirety.

BACKGROUND

1. Field of the invention

The present invention mainly relates to an encoder and more specifically, to an encoder which optically detects positional information of a moving body.

2. Description of Related Art

In recent years, as a scan-type encoder, an encoder has been proposed which detects positional information of a scale that moves along with a moving body and has gratings periodically formed along the movement direction, by irradiating the scale with irradiation light modulated on the basis of a given modulation signal and then comparing the reflected light or transmitted light thereof with the modulation signal (U.S. Pat. No. 6,639,686).

Also, as the scan-type encoder, there is a technique of detecting the amount of movement of a moving body on the basis of a change in the intensity of interfering light in an interference state by using a three-grating optical system which separates a laser light emitted from a light source into ±first-order light beams using a first diffraction grating and reversing the directions of the separated ±first-order light beams using a second diffraction grating, thereby forming an interference fringe on a third diffraction grating moving along with the moving body (Japanese Patent Application Publication No. 2007-333722),

SUMMARY

In these scan-type encoders, it is necessary to periodically modulate the irradiation light and, for example, as a method of physically oscillating a light beam, a method of oscillating a light source or a method of disposing an oscillation-rotating oscillating mirror in the optical path is considered.

However, in the case of mechanically driving the mirror, since a driving mechanism is complicated, there is a problem in that an increase in the cost of a device is caused, Also, in this case, since installation space for the configuration of oscillating the light source or the configuration of disposing the oscillating mirror is required, there is a problem in that the size of the device is increased.

Also, as the support methods of these mechanical light beam oscillation configurations, it is necessary to adopt a support method such as mechanical mounting, for example, screw fastening, adhesion, or the like. In the case of using such a support method, there is a possibility that position variation may occur due to a change in environment such as temperature or humidity, thereby becoming a factor which causes drifting of the oscillation center. If such drifting occurs, in view of a measurement principle, a detection position has drifted, so that there is a possibility that a very large error may occur as a high-resolution sensor.

An aspect of the invention has an object to provide an encoder in which a physical light modulation means is removed, whereby errors in displacement detection of a moving body can be reduced.

According to an aspect of the invention, there is provided an encoder comprising: a light source section which emits light, a wavelength of which periodically changes, in a parallel fashion; a first optical member which receives the light emitted from the light source section and then emits a first light and a second light; a second optical member which changes a travelling direction of the first light or the second light such that the first and second light emitted from the first optical member overlap each other; a diffraction grating member which is disposed at a position where the first light and the second light overlap each other, is displaced relatively with respect to the light source section, the first optical member, and the second optical member, and has a diffraction grating periodically formed along a movement direction by the displacement; and a first light receiving section which receives an interfering light of the first and second light, which is emitted from the diffraction grating member, and detects an interference intensity of the interfering light, wherein an optical path length of a first optical path of the first light from the light source section to the diffraction grating member and an optical path length of a second optical path of the second light from the light source to the diffraction grating member are different from each other.

According to an aspect of the invention, by emitting modulated light with, a wavelength periodically changed from the light source section and making the optical path lengths of two interfering modulated light beams be different from each other, it is possible to avoid a problem in the configuration of physically changing the wavelength of light. For example, a complicated driving mechanism for mechanically driving a mirror, as in the method of disposing an oscillation-rotating oscillating mirror in the optical path, is not required, so that a reduction in the cost of the device can be realized. Additionally, installation space for disposing the oscillating mirror is not required, so that a reduction in the size of the device can be realized. Further, since the configuration of mechanically oscillating a light beam is not required, it is possible to reduce generation of an error at the time of detection of the movement amount, which has been a problem in the past, due to generation of drifting of the oscillation center caused by a change in environment such as temperature or humidity, in a case where mechanical mounting is used.

DESCRIPTION OF EMBODIMENTS

First Embodiment

Figure 1:
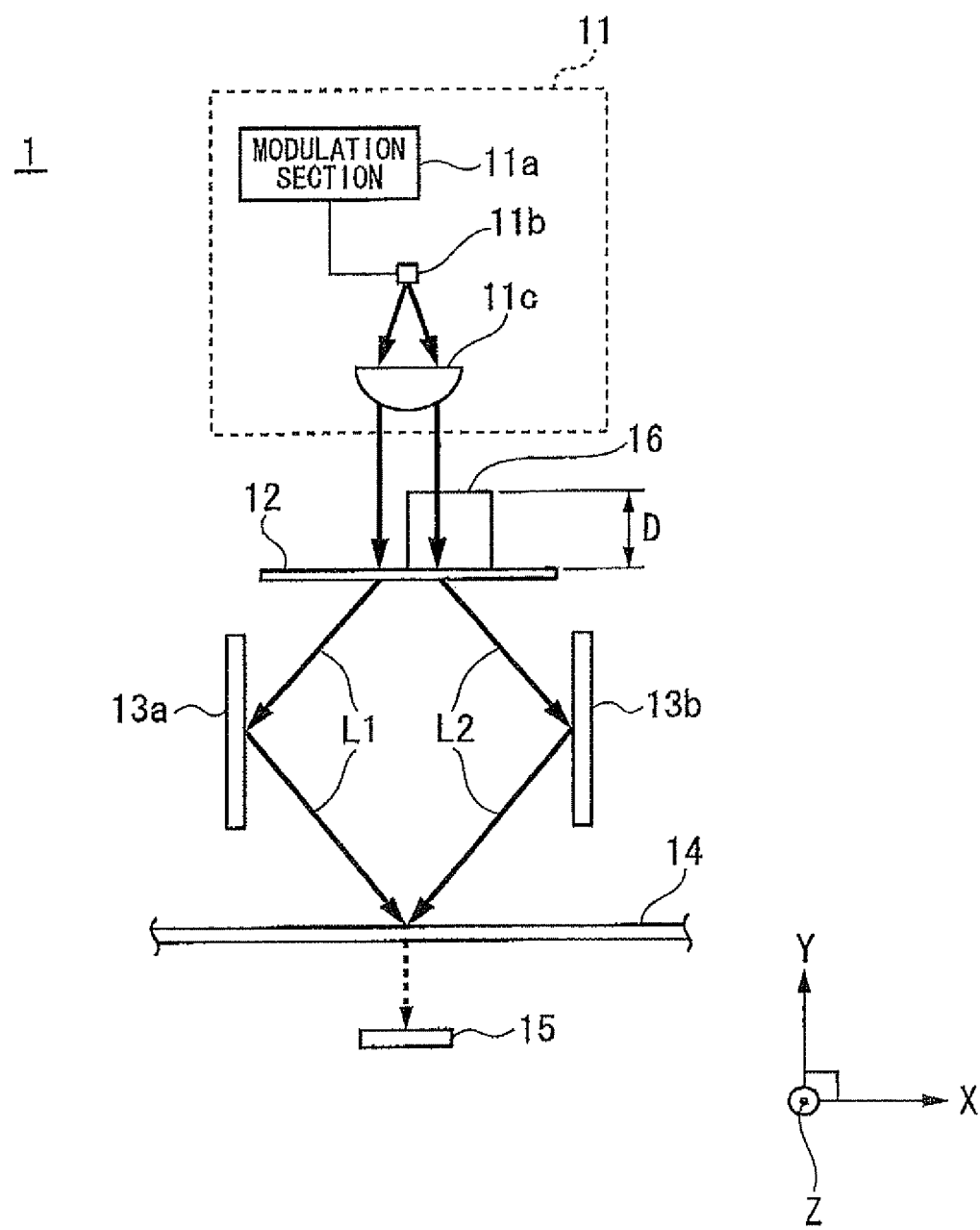
FIG. 1 is a schematic view illustrating a first embodiment.

Hereinafter, one embodiment of the invention will be described with reference to the drawings. FIG. 1 is a schematic view illustrating the configuration of an encoder 1 related to one embodiment of the invention. In this embodiment, the encoder 1 is an encoder of a so-called diffraction interference system and is an optical encoder which detects the movement direction, the movement amount, or the displacement of a moving body (a moving grating) which moves in a given direction (the X-axis direction).

As shown in FIG. 1, in this embodiment, the encoder 1 includes a light source section 11, an index grating 12, a pair of mirrors 13a and 13b, a light receiving element 15, a glass block 16, and a moving grating 14 which is provided to be able to be displaced relatively with respect to these constituent members.

The light source section 11 includes a modulation section 11a, a light source 11b, and a collimator lens 11c.

The modulation section (modulating device) 11a periodically changes the wavelength of light which is emitted from the light source 11b, by changing, for example, an electric current which is supplied to the light source 11b. The modulation section 11a can change, for example, the wavelength, $\lambda$=850 nm, of the light which is emitted from the light source 11b by an amount corresponding to $\Delta\lambda$=±5 nm. That is, the modulation section 11a can change the wavelength of the light which is emitted from the light source 11b, in the range of $\lambda$=845 nm to 855 nm.

The light source 11b is, for example, a laser element which emits a laser light, and emits coherent light modulated by the modulation section 11a in the -Y-axis direction.

The collimator lens 11c receives the light emitted from the light source 11b and then converts the light into parallel light.

The index grating (a first optical member) 12 receives the light emitted from the light source section 11 and then emits a first light L1 and a second light L2 from different positions. For example, the index grating 12 is a diffraction grating, in which grating-shaped patterns are formed at a predetermined pitch, and is a transmission-type diffraction grating having diffraction patterns periodically formed along the X-axis direction. The index grating 12 receives the parallel light penetrating the collimator lens 11c and then emits a plurality of diffracted light.

Among the diffracted light diffracted by the index grating 12, the light which directly enters from the collimator lens 11c into the index grating 12 and is then emitted from the index grating 12 is set to be the first light L1 and the light which penetrates the glass block 16 and is then emitted from the index grating 12 is set to be the second light L2. Here, the first light L1 is a -first-order diffracted light diffracted from the index grating 12 in the -X-axis direction side at a predetermined diffraction angle, and the second light L2 is a +first-order diffracted light diffracted from the index grating 12 in the +X-axis direction side at a predetermined diffraction angle.

The mirrors 13a and 13b are optical members (a second optical member) which change the travelling directions of the first light L1 and the second light L2 such that the first and second light beams L1 and L2 emitted from the index grating 12 overlap each other in the moving grating 14. As shown in the drawing, the mirrors 13a and 13b are disposed between the index grating 12 and the moving grating 14 and disposed such that the respective reflection surfaces face each other in a direction (the Y-Z-axis direction) perpendicular to the plane directions (the incidence plane directions or the X-Z-axis direction) of the index grating 12 and the moving grating 14. The mirror 13a reflects the first light L1 emitted from the index grating 12 toward the moving grating 14 and the mirror 13b reflects the second light L2 toward the moving grating 14. Alternatively, the encoder 1 can also use a transmission-type diffraction grating which changes the travelling directions of the first light L1 and the second light L2 such that the first and second light beams L1 and L2 emitted from the index grating 12 overlap each other in the moving grating 14, in place of at least one of the mirrors 13a and 13b.

The moving grating 14 is disposed at a position when the first light L1 and the second light L2 overlap each other and is a diffraction grating provided at the moving body which is displaced relatively with respect to the light source section 11, the index grating 12, the mirrors 13a and 13b, the light receiving element 15, and the glass block 16. The moving grating 14 is a diffraction grating having diffraction patterns periodically formed along the movement direction (the X-axis direction) by the displacement. The first and second light beams L1 and L2 entering into the moving grating 14 partially overlap and interfere with each other.

The moving grating 14 is, for example, a transmission-type diffraction grating and diffracts interfering light based on the first light L1 and the second light L2 and then emits the interfering light in the same direction (the -Y-axis direction) that is, toward the light receiving element 15.

In this manner, the index grating 12, the mirrors 13a and 13b, and the moving grating 14 are disposed in a positional relationship in which the first and second light beams L1 and L2 entering into the moving grating 14 interfere with each other. Also, the index grating 12, the mirrors 13a and 13b, and the moving grating 14 have a positional relationship in which the optical path lengths of the first light L1 and the second light L2 after they are emitted from the index grating 12 and until they enter into the moving grating 14 are equal to each other.

The light receiving element 15 receives the interfering light emitted from the moving grating 14 and outputs a photoelectric conversion signal which represents the interference intensity of the interfering light. The photoelectric conversion signal converted in the light receiving element 15 is output to a device (not shown) that detects the movement amount of the moving grating 14. In addition, the moving grating 14 is not limited to the transmission-type diffraction grating, but may be, for example, a reflection-type diffraction grating, and in this case, the light receiving element 15 is disposed at a position where it can receive reflected light.

The glass block 16 is disposed in either one of the optical path of the first light L1 or the optical path of the second light L2 between the light source section 11 and the index grating 12 and transmits a portion of the parallel light from the collimator lens 11c. The glass block 16 has a predetermined refractive index N1 and a predetermined thickness D in the travelling direction (the Y-axis direction) of the parallel light which is emitted from the collimator lens 11c.

In this embodiment, the glass block 16 is disposed in the optical path of the second light L2. In this way, the optical path length of the second light L2 which penetrates the glass block 16 becomes long compared to the optical path length of the first light L1 which penetrates the air, in accordance with the magnitudes of the refractive index N1 and the thickness D thereof. That is, the optical path length of a second optical path of the second light L2 from the light source lib to the moving grating 14 becomes long compared to the optical path length of a first optical path of the first light L1 from the light source 11b to the moving grating 14. Here, the optical path length is an optical distance which is obtained by multiplying the spatial distance (a path) by the refractive index. In this embodiment, the optical distance from the light source section 11 to the moving grating 14 is substantially different between the first light L1 and the second light L2. In this embodiment, a medium in the optical path of the first light L1 from the light source section 11 to the moving grating 14 is partially different from that in the second light L2.

In this manner, the first and second light beams L1 and L2 based on the modulated light emitted from the light source 11b have a predetermined phase difference in a state of interfering at the moving grating 14, whereby the encoder 1 can obtain an interference fringe, which periodically changes in the movement direction (the X-axis direction), on the moving grating 14. In addition, the periodic change of the interference fringe is based on a periodic change in the wavelength modulated by the modulation section 11a, and the photoelectric conversion signal which is obtained by the light receiving element 15 is expressed by the movement information of the moving grating 14 modulated with a modulated signal of a wavelength by the modulation section 11a. Therefore, the photoelectric conversion signal which is obtained by the light receiving element 15 is based on both the movement information of the moving grating 14 and a periodic change of the modulated light which is emitted from the light source 11b, and on the basis of the photoelectric conversion signal, the movement information of the moving grating 14 can be obtained by using the known modulation information of the modulation section 11a.

Next, one example of an interfering light detection method by the encoder 1 will be described.

The modulated light in which the wavelength of light is modulated by the modulation section 11a is emitted in the −Y-axis direction from the light source 11b. The modulated light emitted from the light source 11b penetrates the collimator lens 11c, thereby being converted into parallel light. A portion of the parallel light converted by the collimator lens 11c directly enters into the index grating 12 and is diffracted into the first light L1 by the index grating 12. The first light L1 is deflected to the −X-axis direction side and emitted from the index grating 12.

On the other hand, another portion of the parallel light emitted from the collimator lens 11c penetrates the glass block 16 and then enters into the index grating 12. The light penetrating the index grating 12 through the glass block 16 is diffracted into the second light L2 by the index grating 12. The second light L2 is deflected to the +X-axis direction side and emitted from the index grating 12. In addition, the first light L1 and the second light L2 are emitted from different positions of the index grating 12.

The first light L1 emitted from the index grating 12 is reflected by the mirror 13a to be deflected to the +X-axis direction side, and then enters into the moving grating 14. On the other hand, the second light L2 emitted from the index grating 12 is reflected by the mirror 13b to be deflected to the −X-axis direction side, and then enters into the moving grating 14.

The first and second light beams L1 and L2 entering into the moving grating 14 partially overlap each other on the diffraction pattern of the moving grating 14 and an interference fringe which periodically changes is formed on the moving grating 14.

The first and second light beams L1 and L2 entering into the moving grating 14 are diffracted together in the −Y-axis direction by the moving grating 14. The interfering light based on the first and second light beams L1 and L2 emitted from the moving grating 14 enters into the light receiving element 15 and is converted into a photoelectric conversion signal, which represents the interference intensity of the interfering light.

In a case where the moving grating 14 has moved, the interference state of the first and second light beams L1 and L2 entered into the moving grating 14 changes, so that the light quantity of the light which enters into the light receiving element 15 changes sinusoidally. In a given movement amount detection device, the number of times of a change of the receiving light quantity of the light receiving element 15, which changes sinusoidally, is counted and the movement direction, the movement amount, or the displacement of the moving grating 14 is detected. A movement amount detection method by such a movement amount detection device is the same as the principle of a general encoder and can use, for example, the signal processing method of PTL 1 described above as the background art.

In the above-described configuration, the interfering light emitted from the moving grating 14 contains the displacement information of the moving grating 14 according to the diffraction pattern of the moving grating 14, in addition to the periodic change information of the interference fringe according to a phase difference. Accordingly, the interference intensity of the interfering light, which is obtained by the light receiving element 15, changes in accordance with (1) a phase difference between the first and second light beams L1 and L2 based on the modulation imparted by the modulation section 11a and an optical path difference between the first light L1 and the second light L2, and (2) the movement direction, the movement amount, or the displacement of the moving grating 14.

That is, (1) by adjusting the phase difference between the fast light L1 and the second light L2, (2) it is possible to increase the precision of the detected movement information of the moving grating 14. In addition, as a phase difference which is set in order to increase the precision of the movement information which is detected here, a structure, resolution, or the like of the device is considered.

Here, as for the phase difference between the first light L1 and the second light L2, in a case where the wavelength of light has been modulated from $\lambda_1$ to $\lambda_2$ by the modulation section 11a, if $\Delta k$ is set to be equal to $2\pi(1/\lambda_1 - 1/\lambda_2)$, the phase difference is expressed by an expression, phase difference=$\Delta L \cdot \Delta k$. Also, the optical path difference between the first light L1 and the second light L2 is generated by a difference in refractive index between the glass block 16 and a surrounding area due to disposition of the glass block 16 having different refractive index from that of the surrounding area on either optical path, and when the refractive index of the surrounding area is set to be n1, the actual distance (path length) of the light penetrating the inside of the glass block 16 is equal to the thickness D and the optical path difference is expressed by an expression, $\Delta L = (D \cdot N1) - (D \cdot n1)$.

Also, in the encoder 1, even in a case where the wavelength variable range of the modulated light that is emitted from the light source section 11 is small, if the optical path difference $\Delta L$ is made sufficiently large compared to the wavelength variable range, it is possible to impart a change according to a periodic change of the modulated light that is emitted from the light source section 11, to the interference fringe that is formed on the moving grating 14. For example, in a case where a surface-emitting laser diode is used as the light source 11b, if the central wavelength of the modulated light that is emitted from the light source section 11 is set to be 850 nm and a driving electric current that is supplied to the surface-emitting laser diode is changed in the range of 2±0.5 mA, the wavelength of the light that is emitted from the light source section 11 changes in the range (wavelength variable range) of 850±1 nm. At this time, in a case where the glass block 16, in which the optical path difference $\Delta L$ is made to be 1 mm, has been used, since the optical path difference $\Delta L$ is sufficiently large compared to the wavelength variable range, the interference fringe that is formed on the moving grating 14 periodically changes, so that the light receiving element 15 can obtain a photoelectric conversion signal with modulation of the relationship of phase difference=±1.35×2π imparted thereto.

Accordingly, in the encoder 1, by emitting the modulated light with a wavelength periodically changed from the light source section 11 and making the optical path lengths of two interfering modulated light beams be different from each other, it is possible to avoid a problem in a configuration in which modulation is physically imparted to light. For example, a complicated driving mechanism for mechanically driving a mirror, as in the method of disposing an oscillation-rotating oscillating mirror in the optical path, is not required, so that a reduction in the cost of the device can be realized. Also, an installation space for disposing the oscillating mirror is not required, so that a reduction in the size of the device can be realized. Further, since the configuration of mechanically oscillating a light beam is not required, it is possible to reduce the generation of errors at the time of detection of a movement amount, which has been a problem in the past, due to the generation of drifting of the oscillation center caused by a change in environment such as temperature or humidity, in a case where mechanical mounting is used.

In addition, in a case where the wavelength of the modulated light that is emitted from the light source 11b is modulated to be $\Delta\lambda = \lambda_0 + \sin \omega t$, if $\Delta k$ is set to be equal to $A_0 \sin \omega t$, the phase difference, $\Delta L \cdot \Delta k$, becomes equal to $\Delta L \cdot A_0 \sin \omega t$. Accordingly, the interference intensity of the interfering light which is obtained by the light receiving element 15 is expressed by an expression, $|E|^2 = A + 2\cos(4\pi X/P + \Delta L \cdot A_0 \sin \omega t)$. Here, "X" represents the relative position of the moving grating 14 to the index grating 12, "P" represents the pitch of the diffraction patterns of the moving grating 14, and "A" represents the offset amount of the interference intensity amplitude. The interference intensity of the interfering light can be used in the signal processing of the encoder 1, for example, the signal processing of PTL 1 described above as background art.

Also, as for the modulation method of the modulated light that is emitted from the light source 11b, as a modulation method by a change of an electric current by the above-mentioned modulation section 11a, for example, various variable wavelength lasers which are used for a purpose such as optical communication can be used. Also, the modulation method of the modulated light that is emitted from the light source 11b is not limited to the modulation method based on a change of an electric current and, for example, a device can be used which periodically changes a wavelength by changing the temperature of a laser element that is used as the light source 11b.

Further, in the encoder 1, the light source section 11, the index grating 12, the pair of mirrors 13a and 13b, the light receiving element 15, and the glass block 16 are an integrated constituent member in which they are fixed in a predetermined positional relationship, and are installed in a state where the integrated constituent member can move relatively with respect to the moving grating 14. That is, the encoder 1 may have a configuration in which the integrated constituent member is fixed and the forming moving grating 14 is movably provided, or may have a configuration in which the moving grating 14 is fixed and the integrated constituent member is movably provided.

Also, it is acceptable if the glass block 16 is a medium which transmits light and has a given refractive index N1 different from that of the surrounding area, and the glass block 16 is not limited to a configuration in which it is made of glass.

Second Embodiment

Figure 2:
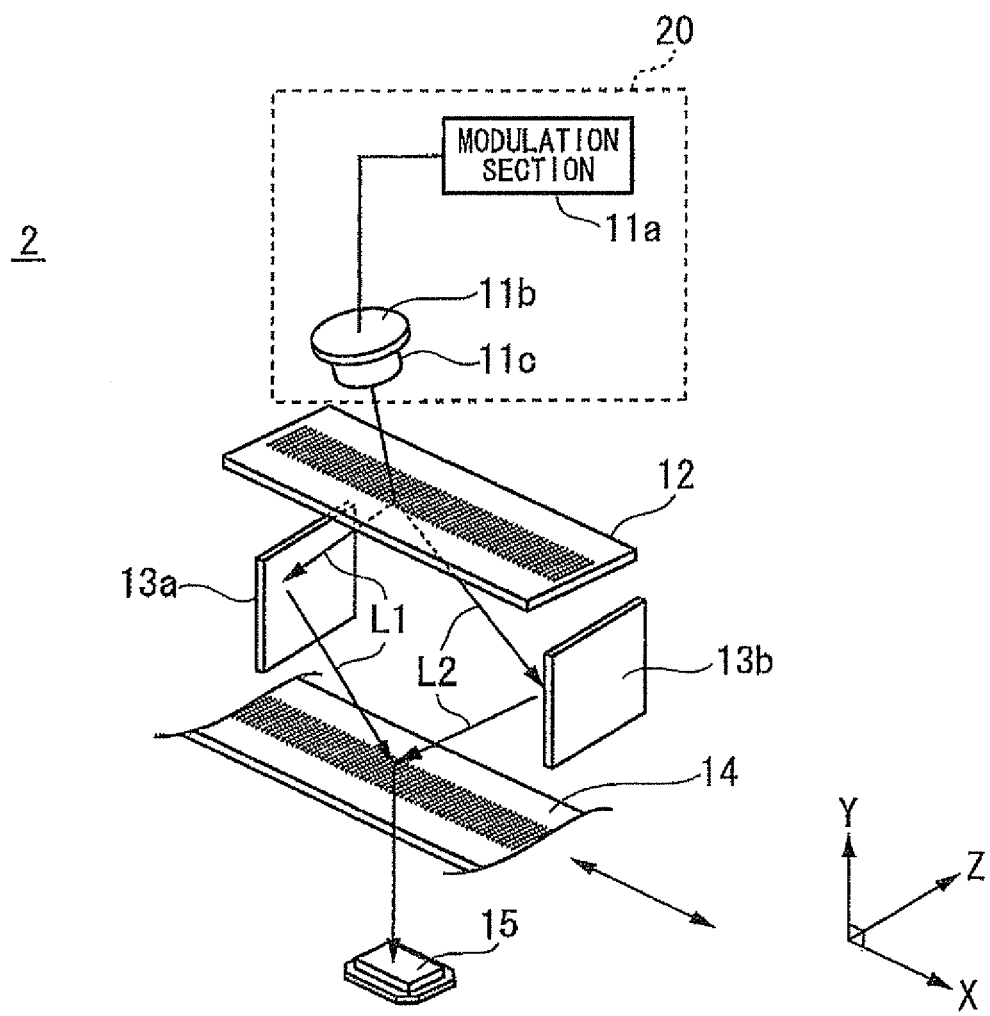
FIG. 2 is a schematic perspective view illustrating a second embodiment.
Figure 3:
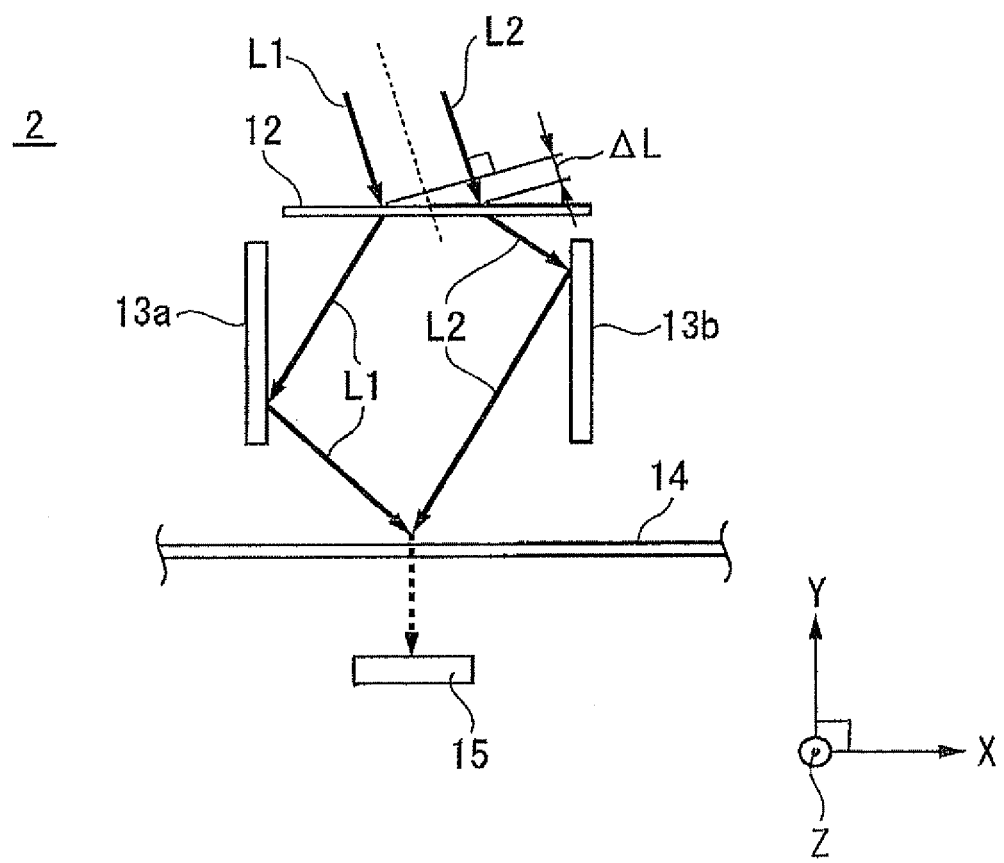
FIG. 3 is a schematic view illustrating the second embodiment.

Next, an encoder related to another embodiment of the invention will be described with reference to FIGS. 2 and 3. FIG. 2 is a schematic perspective view of an encoder 2 related to a second embodiment and FIG. 3 is a schematic view of the encoder 2 related to the second embodiment. In addition, with regard to a constituent member having the same function and configuration as that in the first embodiment, a detailed description thereof is omitted and the same reference numerals are used.

As shown in FIG. 2, the encoder 2 includes a light source section 20, the index grating 12, the pair of mirrors 13a and 13b, the moving grating 14, and the light receiving element 15.

The light source section 20 includes the modulation section 11a, the light source 11b, and the collimator lens 11c, similarly to the light source section 11, and emits coherent modulated light modulated by the modulation section 11a, in a parallel fashion. The light source section 20 is installed at a position where the modulated light that is emitted from the light source section 20 enters into the index grating 12 in a direction obliquely intersecting with the plane direction (the incidence plane direction or the X-Z plane direction) of the index grating 12. The light source section 20 of the encoder 2 related to this embodiment is installed at a position where the modulated light emitted from the light source section 20 enters into the index grating 12 obliquely from the −X-axis side, as shown in FIG. 3.

The index grating 12 emits the first and second light beams L1 and L2 based on the light received from the light source section 20, from different positions, similarly to the first embodiment.

By this configuration, the optical path length of the second light L2 from the light source section 20 to the index grating 12 becomes longer than the optical path length of the first light L1 from the light source section 20 to the index grating 12 by ΔL.

Accordingly, similarly to the above-described embodiment, the encoder 2 can change the interference intensity of the interfering light that is obtained by the light receiving element 15, in accordance with (1) a phase difference based on modulation imparted by the modulation section 11a and the optical path difference between the first light L1 and the second light L2, and (2) the movement direction, the movement amount, or the displacement of the moving grating 14.

Third Embodiment

Figure 4:
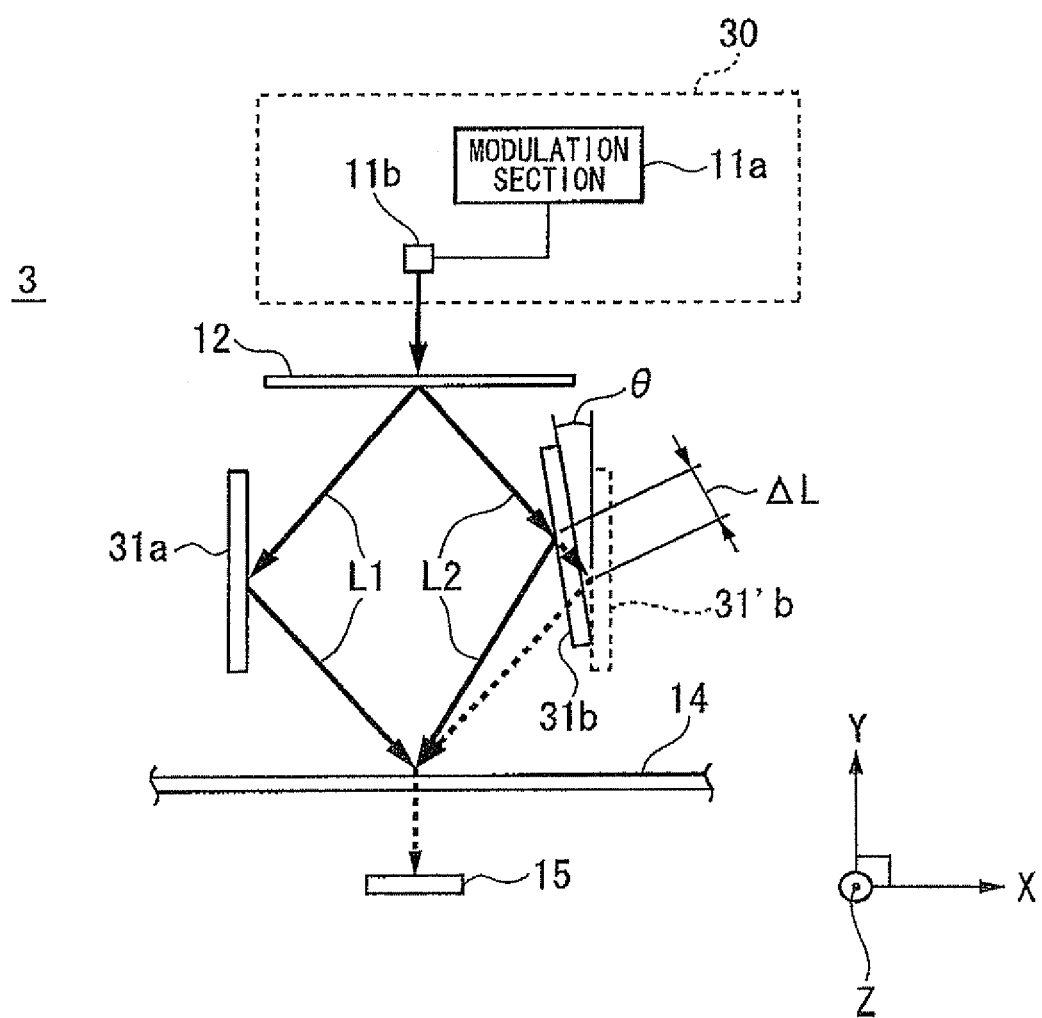
FIG. 4 is a schematic view illustrating a third embodiment.

Next, another embodiment of the invention will be described with reference to FIG. 4. FIG. 4 is a schematic view of an encoder 3 related to a third embodiment. In addition, with regard to a constituent member having the same function and configuration as that in the first embodiment, a detailed description is omitted and the same reference numerals are used.

As shown in FIG. 4, the encoder 3 includes a light source section 30, the index grating 12, a pair of mirrors 31a and 31b, the moving grating 14, and the light receiving element 15.

The light source section 30 includes the modulation section 11a and the light source 11b and emits coherent modulated light modulated by the modulation section 11a.

The mirrors 31a and 31b are disposed between the index grating 12 and the moving grating 14 and the mirror 31a is disposed in a direction (the Y-Z plane direction) in which a reflection surface is perpendicular to the plane directions (the incidence plane directions or the X-Z plane direction) of the index grating 12 and the moving grating 14. On the other hand, the mirror 31b is positioned in a direction in which a reflection surface obliquely intersects with the plane directions (the incidence plane directions or the X-Z plane direction) of the index grating 12 and the moving grating 14. The mirror 31b has a reflection surface which is inclined by an angle θ in the −X-axis direction from a plane direction perpendicular to the plane direction (the incidence plane direction) of a mirror 31'b shown by a dashed line, that is, the plane directions (the incidence plane directions) of the index grating 12 and the moving grating 14, as shown in FIG. 4, for example.

In addition, a state where the mirror 31a and the mirror 31'b shown by a dashed line are disposed means a state where the above-described mirrors 13a and 13b are disposed, and the optical path lengths of the first light L1 and the second light L2 from the index grating 12 to the moving grating 14 are the same. Hereinafter, a positional relationship (refer to FIG. 1) between the index grating 12, the mirrors 13a and 13b, and the moving grating 14 disposed such that the optical path lengths from the index grating 12 to the moving grating 14 become equal to each other in this manner is referred to as a first optical positional relationship. Also, a positional relationship between the index grating 12, the mirrors 31a and 31b, and the moving grating 14 disposed such that the optical path lengths of the first and second light beams L1 and L2 from the index grating 12 to the moving grating 14 are different from each other, as shown in FIG. 4, is referred to as a second optical positional relationship.

In this manner, the mirror 31b on one side is installed at a position where a reflection surface reflecting the second light L2 is inclined further in the −X-axis direction than a position (the mirror 31'b shown by a dashed line) in the case of assuming that the mirror 31b is in the first optical position relationship. By this configuration, the optical path length of the first light L1, until after the first light L1 is emitted from the index grating 12, is reflected by the mirror 31a, and enters into the moving grating 14 becomes long compared to the optical path length of the second light L2 until after the second light L2 is emitted from the index grating 12, is reflected by the mirror 31b, and enters into the moving grating 14.

Accordingly, similarly to the above-described embodiments, the encoder 3 can change the interference intensity of the interfering light that is obtained by the light receiving element 15, in accordance with (1) a phase difference based on modulation imparted by the modulation section 11a and the optical path difference between the first light L1 and the second light L2, and (2) the movement direction, the movement amount, or the displacement of the moving grating 14.

Fourth Embodiment

Figure 5:
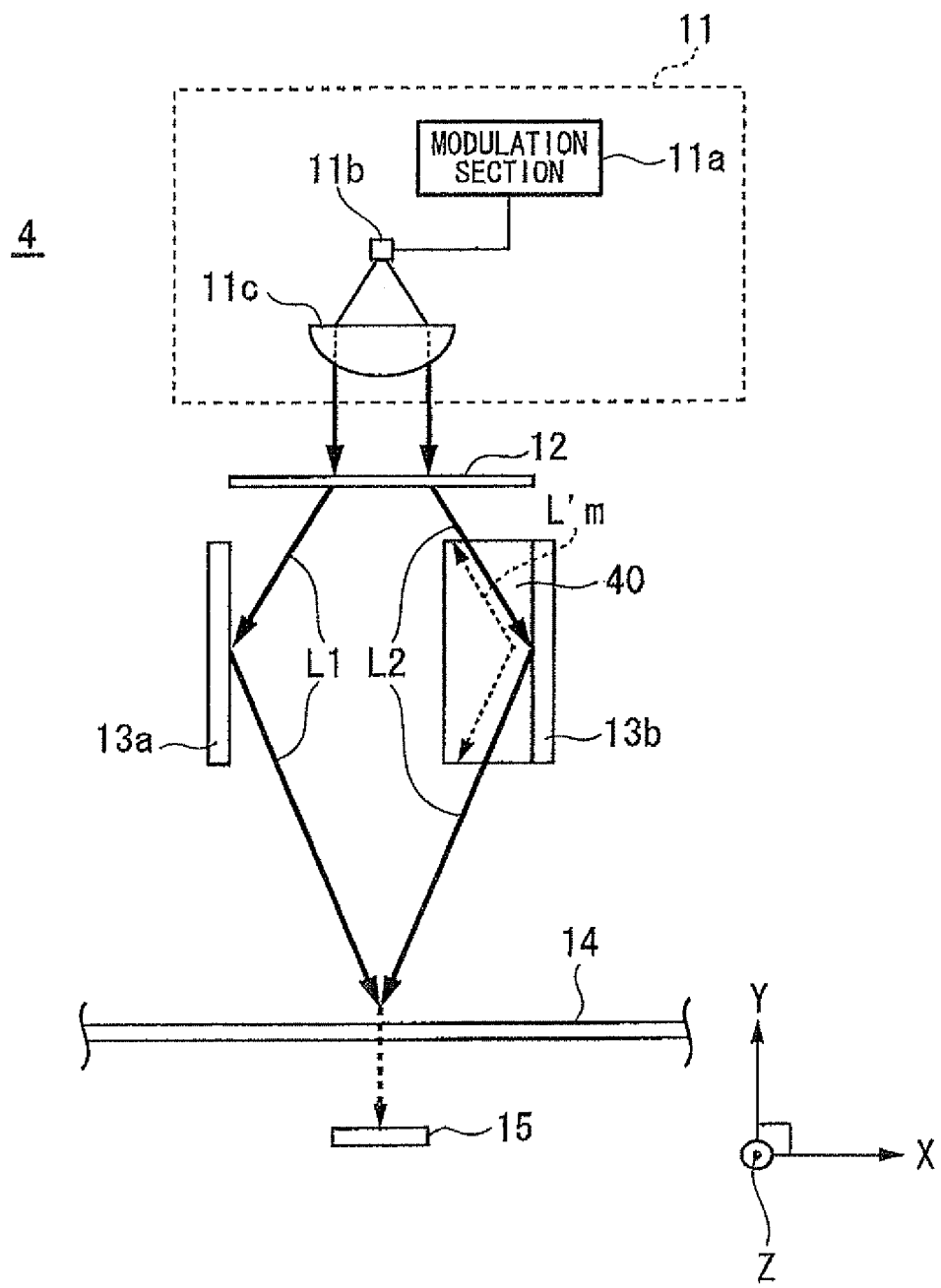
FIG. 5 is a schematic view illustrating a fourth embodiment.

Next, another embodiment of the invention will be described with reference to FIG. 5. FIG. 5 is a schematic view of an encoder 4 related to a fourth embodiment. In addition, with regard to a constituent member having the same function and configuration as that in the first embodiment, a detailed description thereof is omitted and the same reference numerals are used.

As shown in FIG. 5, the encoder 4 includes the light source section 11, the index grating 12, the pair of mirrors 13a and 13b, the moving grating 14, the light receiving element 15, and a glass block 40.

The glass block 40 is disposed in the optical path of the second light L2, for example, and between the index grating 12 and the moving grating 14 and fixed in contact with the reflection surface of the mirror 13b, for example. The glass block 40 has a predetermined refractive index N2 and the actual distance (path length) Lm of the light penetrating the inside of the glass block 40. In addition, the path length Lm in the glass block 40 is the actual distance until the light which has entered into the glass block 40 is reflected by the mirror 13b and emitted from the glass block 40.

Accordingly, the optical path length of the light penetrating the glass block 40 becomes long compared to the light penetrating the surrounding area (for example, the air). In addition, if the refractive index of the surrounding area is set to be n1, the optical path difference ΔL has the relationship of optical path difference ΔL=(Lm·N2)−(LM·n1).

That is, similarly to the above-described embodiments, the encoder 4 can change the interference intensity of the interfering light that is obtained by the light receiving element 15, in accordance with (1) a phase difference based on modulation imparted by the modulation section 11a and the optical path difference between the first light L1 and the second light L2, and (2) the movement direction, the movement amount, or the displacement of the moving grating 14.

It is acceptable if the glass block 40 is disposed in either one of the optical path of the first light L1 or the optical path of the second light L2, and it is acceptable if the glass block 40 is a medium which transmits light and has a predetermined refractive index N2 different from that of the surrounding area, and the glass block 40 is not limited to a configuration in which it is made of glass.

In addition, in FIG. 5, the encoder having a configuration in which the first light L1 and the second light L2 are emitted from different positions of the index grating 12 is illustrated. However, this embodiment is not limited thereto and an encoder having a configuration in which light that is entering into the index grating 12 is separated into the first light L1 and the second light L2 is also acceptable.

Fifth Embodiment

Figure 6:
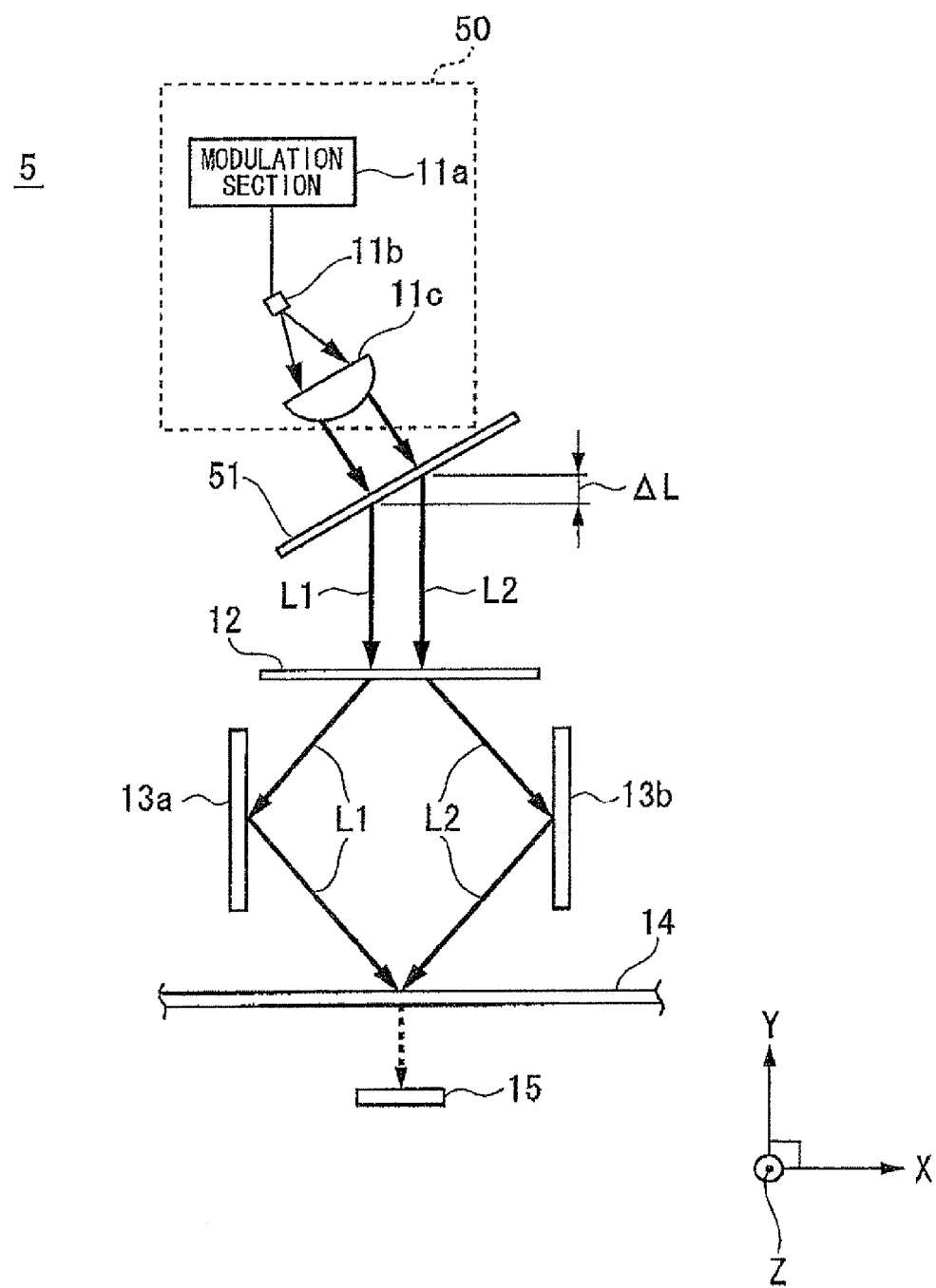
FIG. 6 is a schematic view illustrating a fifth embodiment.

Next, another embodiment of the invention will be described with reference to FIG. 6. FIG. 6 is a schematic view of an encoder 5 related to a fifth embodiment. In addition, with regard to a constituent member having the same function and configuration as that in the first embodiment, a detailed description thereof is omitted and the same reference numerals are used.

As shown in FIG. 6, the encoder 5 includes a light source section 50, the index grating 12, the pair of mirrors 13a and 13b, the moving grating 14, the light receiving element 15, and a fixed diffraction grating 51.

The light source section 50 includes the modulation section 11a, the light source 11b, and the collimator lens 11c, similarly to the light source section 11, and emits coherent modulated light modulated by the modulation section 11a, in a parallel fashion. The light source section 50 is disposed at a position to emit light that enters vertically to the light receiving surface of the fixed diffraction grating 51.

The fixed diffraction grating 51 is disposed in the optical path between the light source section 50 and the index grating 12 and changes the travelling direction of the light emitted from the light source section 50 and also emits the first light L1 and the second light L2 from different positions. In the fixed diffraction grating 51, predetermined diffraction patterns which diffract a plurality of incident parallel light beams in the same direction are formed.

The fixed diffraction grating 51 has a light receiving surface at a position facing the light source section 50 and an emitting surface at a position facing the index grating 12. The light receiving surface of the fixed diffraction grating 51 is disposed at a position perpendicular to the parallel light emitted from the light source section 50 and the emitting surface is disposed at a position obliquely intersecting with the plane direction (incidence plane direction) of the index grating 12. That is, the fixed diffraction grating 51 is disposed in such a manner that a side which emits the first light L1 is close to the index grating 12 compared to a side which emits the second light L2 such that the optical path length of the second light L2 between the fixed diffraction grating 51 and the index grating 12 becomes long compared to the optical path length of the first light L1. In other words, the index grating 12 and the fixed diffraction grating 51 are disposed to face each other in a non-parallel fashion. In addition, it can also be said that the encoder 5 includes an index grating which includes two gratings 12 and 51.

The index grating 12 receives the first light L1 and the second light L2, which are emitted in a parallel fashion from the fixed diffraction grating 51, at different positions and emits the first light L1 and the second light L2 from different positions, as described above.

By this configuration, the optical path length of the first light L1, until after the first light L1 is emitted from the fixed diffraction grating 51 and enters into the moving grating 14 through the index grating 12 and the mirror 13a, becomes short compared to the optical path length of the second light L2 until after the second light L2 is emitted from the fixed diffraction grating 51 and enters into the moving grating 14 through the index grating 12 and the mirror 13b.

That is similarly to the above-described embodiments, the encoder 5 can change the interference intensity of the interfering light that is obtained by the light receiving element 15, in accordance with (1) a phase difference based on modulation imparted by the modulation section 11a and the optical path difference between the first light L1 and the second light L2, and (2) the movement direction, the movement amount, or the displacement of the moving grating 14.

Sixth Embodiment

Figure 7:
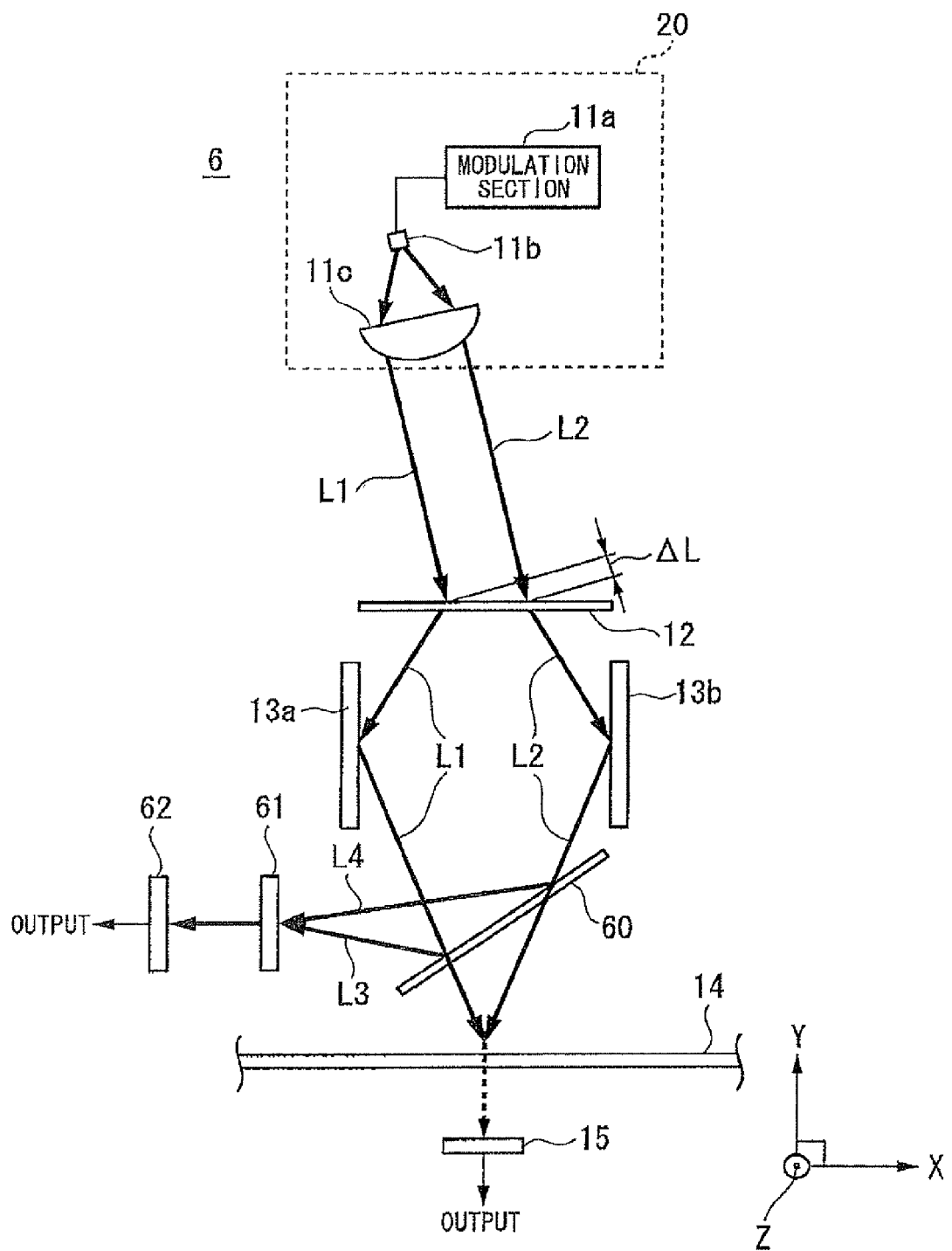
FIG. 7 is a schematic view illustrating a sixth embodiment.

Next, another embodiment of the invention will be described with reference to FIG. 7. FIG. 7 is a schematic view of an encoder 6 related to a sixth embodiment. In addition, in this embodiment, the encoder 6 can be applied to the encoders related to all of the above-described embodiments, and here, a description is performed using an example where it is applied to the encoder 2 related to the second embodiment. Therefore, with regard to a constituent member having the same function and configuration as that in the encoder 2, a detailed description thereof is omitted and the same reference numerals are used.

As shown in FIG. 7, the encoder 6 includes the light source section 20, the index grating 12, the pair of mirrors 13a and 13b, the moving grating 14, the light receiving element 15, a half mirror 60, a compensation grating 61, and a light receiving element 62.

The half mirror 60 is fixed to a side, to which the light source section 20 is fixed, on the optical path between the mirrors 13a and 13b and the moving grating 14 and at a position obliquely intersecting with the plane direction of the moving grating 14. The half mirror (a branching section) 60 separates each of the first light L1 and the second light L2 by reflecting or transmitting the received first and second light beams L1 and L2. The first light L1 and the second light L2 are respectively branched through the half mirror 60 between the index grating 12 and the moving grating 14. The first and second light beams L1 and L2 penetrating the half mirror 60 enter into the moving grating 14 so as to overlap each other, as described above, On the other hand, the half mirror 60 emits a third light L3 and a fourth light L4, each of which is the reflected light of each of the first light L1 and the second light L2, toward the compensation grating 61 so as to overlap each other.

The compensation grating (complementary grating) 61 is a diffraction grating which is fixed at a position where the third and fourth light beams L3 and L4 emitted by the half mirror 60 overlap each other and in which the same diffraction pattern as the diffraction pattern of the moving grating 14 is periodically formed along the Y-axis direction. The compensation grating 61 is fixed at a position where the respective optical path lengths from the half mirror 60 to the moving grating 14 of the first and second light beams L1 and L2 which enter into the moving grating 14 respectively become equal to the respective optical path lengths from the half mirror 60 to the compensation grating 61 of the third and fourth light beams L3 and L4 which enter into the compensation grating 61.

The light receiving element (complementary light receiving section) 62 receives interfering light emitted from the compensation grating 61 and outputs a photoelectric conversion signal representing the interference intensity of the interfering light. The photoelectric conversion signal output by the light receiving element 62 can be used in a given compensation device (not shown) as a compensation signal for the photoelectric conversion signal output in the light receiving element 15. The compensation device can calculate, for example, a difference between positional information obtained by the signal processing of the above-described PTL 1 on the photoelectric conversion signal output by the light receiving element 15 and a compensation signal which is obtained by performing the same processing on the photoelectric conversion output by the light receiving element 62, and thereby detect the variation of the central wavelength of modulation, the displacement in the Z-axis direction of the moving grating 14, or the like.

By this configuration, the optical path length of the first light L1, until after the first light L1 is emitted from the light source section 20 and enters into the half mirror 60, becomes short compared to the optical path length of the second light L2 until after the second light L2 is emitted from the light source section 20 and enters into the half mirror 60. For this reason, the third and fourth light beams L3 and L4 which enter into the compensation grating 61 are modulated and have a phase difference in a state of interfering with the compensation grating 61. Accordingly, a periodically moving interference fringe which is the same as an interference fringe that is formed on the moving grating 14 is formed on the compensation grating 61.

That is the light receiving element 62 can detect-movement of the interference fringe that is formed on the moving grating 14, through the compensation grating 61. Accordingly, by performing a given signal processing by the compensation device or the like with use of the compensation signal, it can be of help to improve-measurement stability of the displacement in a given movement direction (the X-axis direction) of the moving grating 14.

Seventh Embodiment

In the invention, as described previously, the wavelength of the light that is emitted from the light source is periodically modulated. In a case where an electric current that is supplied to the light source is modulated to periodically modulate the wavelength of the light that is emitted from the light source, modulation of the amount of light is also involved in addition to the modulation of the wavelength. Since the degree of modulating the wavelength is small, the modulation of the amount of light is small. However, the need to remove the modulation of the amount of light can also be considered. Hereinafter, an embodiment for it will be described with reference to FIG. 8. However, this can be applied to the encoders related to all of the above-described embodiments. In addition, an encoder 7 of this embodiment is described using an example where it is applied to the encoder 1 related to the first embodiment. Therefore, with regard to a constituent member having the same function and configuration as that in the encoder 1, a detailed description thereof is omitted and the same reference numerals are used.

Figure 8:
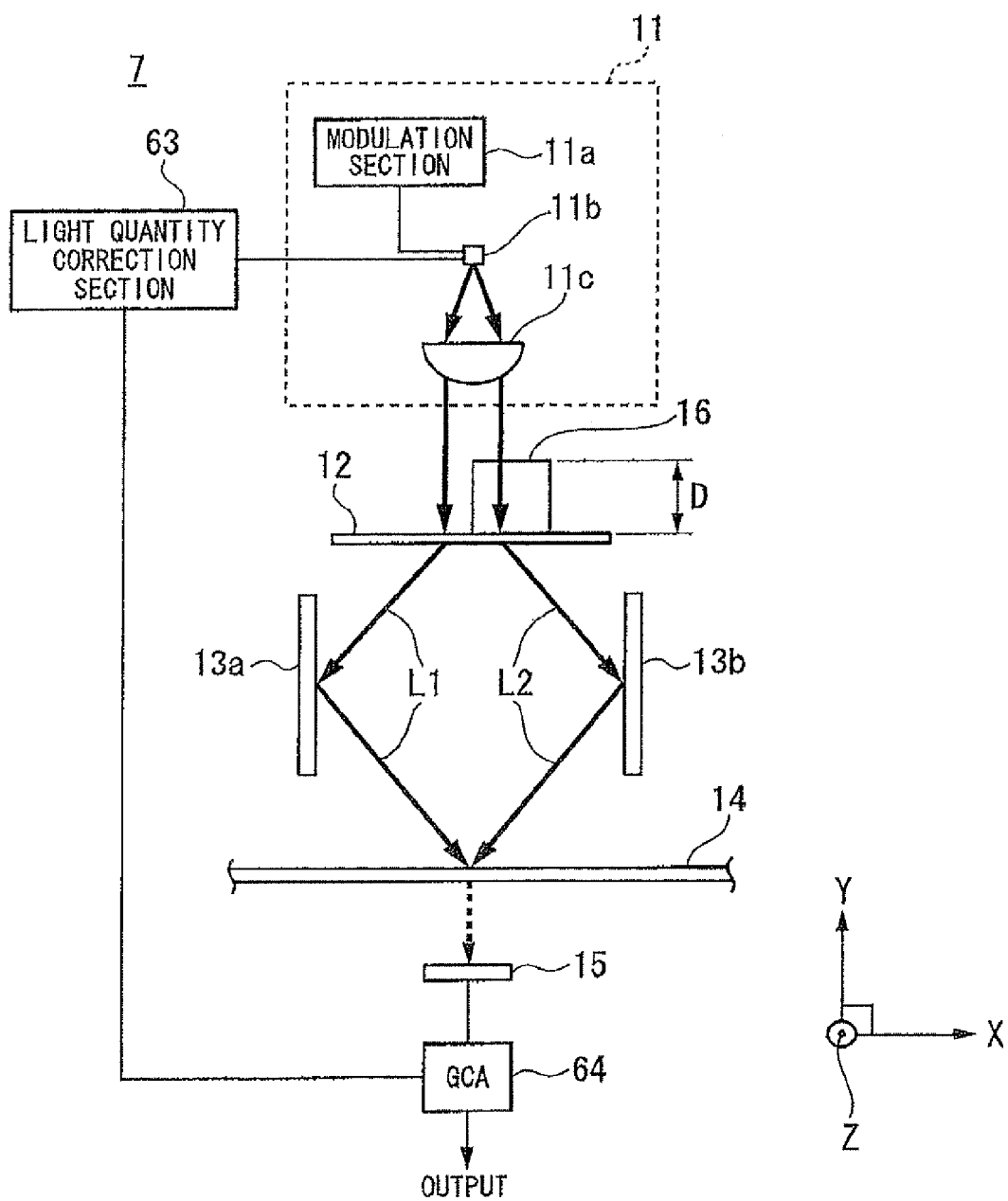
FIG. 8 is a schematic view illustrating a seventh embodiment.

As shown in FIG. 8, the encoder 7 includes the light source section 11, the index grating 12, the pair of mirrors 13a and 13b, the light receiving element 15, the glass block 16, the moving grating 14 which is provided to be able to be displaced relatively with respect to these constituent members, a light quantity correction section 63, and a GCA (Gain Control Amplifier) 64. A light quantity compensation system is configured to include the light quantity correction section 63 and the GCA 64.

The light source 11b is provided with a light quantity sensor that detects the light quantity of the emitting light and outputs an electric signal according to the light quantity detected by the light quantity sensor to the light quantity correction section 63. Here, the light quantity of the light that is emitted from the light source 11b changes in accordance with the electric current that is supplied from the modulation section 11a. For example, the interference intensity of the interfering light that is obtained by the light receiving element 15 has the relationship of $|E|^2=(1+F \sin \omega t) \cdot \{A+2 \cos(4\pi X/P+\Delta L \cdot A_0 \sin \omega t)\}$, and compared to the case of emitting the modulated light from the light source 11b by changing the electric current, an intensity modulation term, $(1+F \sin \omega t)$, according to a change of the electric current that is supplied from the modulation section 11a is generated. This intensity modulation terra destabilizes the output voltage level of the photoelectric conversion signal that is output from the light receiving element 15.

The light quantity correction section 63 is connected to each of the light source 11b and the GCA 64 and controls the level of the output voltage of the photoelectric conversion signal that is output from the light receiving element 15, on the basis of an electric signal output from the light quantity sensor of the light source 11b. That is, the light quantity correction section 63 outputs a control signal, in which the intensity modulation term becomes "1", to the GCA 64 so as to decrease the influence of the intensity modulation term, $(1+F \sin \omega t)$, according to a change of the electric current that is supplied from the modulation section 11a.

The GCA 64 is connected to the light receiving element 15, adjusts the level of the output voltage of the photoelectric conversion signal received from the light receiving element 15, on the basis of the control signal from the light quantity correction section 63, and outputs a signal in which a variation due to a change in light quantity is corrected.

In addition, the encoder 7 related to this embodiment is not limited to the above-described configuration and, for example, not only a configuration in which the light source 11b holds the light quantity sensor, but also a configuration is acceptable in which a given light quantity sensor that receives the light which is emitted from the light source section 11 is installed at an arbitrary position and the light quantity correction section 63 controls the GCA 64 on the basis of an electric signal according to the light quantity detected by the light quantity sensor provided at the arbitrary position. By using such a light quantity sensor, it is possible to remove the variation due to the above-mentioned change in the control of the GCA 64 in a case where a change of the electric current that is supplied by the modulation section 11a and a change in light quantity of the light that is emitted from the light source 11b do not completely correspond to each other.

Also, in a case where the variation due to the above-mentioned change is not considered, the light quantity sensor is not required and the light quantity correction section 63 may have a configuration in which the light quantity correction section 63 receives a signal representing a change of the electric current that is supplied from the modulation section 11a and controls the GCA 64 on the basis of the signal representing a change of the electric current.

Also, by such a configuration, it is possible to avoid a situation where the output voltage level of the photoelectric conversion signal that is output from the light receiving element 15 becomes unstable.

In addition, the encoder according to the invention may be either a three-grating encoder or a two-grating encoder. As the two-grating encoder, for example, there is an encoder having a configuration including an index grating that receives the modulated light emitted from a light source section in a parallel fashion and emits the first light L1 and the second light L2, and a moving grating that is disposed at a position where the first light L1 and the second light L2 overlap each other and is displaced relatively with respect to the light source section and the index grating. The two-grating encoder having such a configuration can obtain an interference fringe in the moving grating by using different orders of diffracted light as the first and second light beams L1 and L2 which are separated by the index grating. For example, as the first light L1 and the second light L2, a first-order diffracted light and a second-order diffracted light, or a zero-order diffracted light and the first-order diffracted light can be respectively used.

In one embodiment, an encoder can be provided that includes a light source section which includes a modulation device and emits light, the wavelength of which periodically changes; an index grating, into which the light from the light source section enters and from which a first diffracted light and a second diffracted light are emitted; a moving grating, into which the first diffracted light and the second diffracted light enter and which can be displaced relatively with respect to the index grating; and a light receiving section which detects interfering light of the first and second diffracted light, which is emitted from the moving grating, wherein the optical distance from the light source section to the moving grating is substantially different between the first diffracted light and the second diffracted light.

In the above-described embodiment, the encoder can further include a transmissive member which is disposed between the light source section and the index grating, has a predetermined refractive index, and transmits a portion of the light from the light source section. In this case, one of the first diffracted light and the second diffracted light passes through the transmissive member and the other does not pass through the transmissive member.

In the above-described embodiment, the encoder can further include an optical member which is disposed between the index grating and the light receiving section and in which one of the first diffracted light and the second diffracted light passes therethrough, whereby a difference in the optical distance is generated.

In this case, for example, the optical member is a mirror into which one of the first diffracted light and the second diffracted light enters at a predetermined angle. Also, for example, the optical member is a transmissive member which has a predetermined refractive index and in which one of the first diffracted light and the second diffracted light passes therethrough.

In the above described embodiment, the light from the light source section may obliquely enter into the index grating.

In the above-described embodiment, the index grating can include at least two gratings which are disposed such that they face each other in a non-parallel fashion.

In the above-described embodiment, the encoder can include, between the index grating and the moving grating, a branching section in which the first diffracted light and the second diffracted light pass therethrough, thereby being branched, a complementary grating into which the branched first and second diffracted light enter and which is substantially fixed with respect to the index grating, and a complementary light receiving section which detects interfering light of the first and second diffracted light from the complementary grating.

In the above-described embodiment, the encoder can be provided with a light quantity compensation system which compensates a change in light quantity accompanying a change in wavelength of the light.

What is claimed is:

1. An encoder comprising:
a light source section which emits a light, a wavelength of which periodically changes, in a parallel fashion;
a first optical member which receives the light emitted from the light source section and then emits a first light and a second light, the first optical member emitting the first light and the second light from different positions;
a second optical member which changes a travelling direction of the first light or the second light such that the first and second lights emitted from the first optical member overlap each other;
a diffraction grating member which is disposed at a position where the first light and the second light overlap each other, is displaced relatively with respect to the light source section, the first optical member, and the second optical member, and has a diffraction grating periodically formed along a movement direction by the displacement;
a first light receiving section which receives an interfering light of the first and second lights, which is emitted from the diffraction grating member, and detects an interference intensity of the interfering light,
wherein an optical path length of a first optical path of the first light from the light source section to the diffraction grating member and an optical path length of a second optical path of the second light from the light source section to the diffraction grating member are different from each other, and
the encoder further comprising a transmissive member which is disposed between the light source section and the first optical member in either the first optical path or the second optical path and has a predetermined refractive index.

2. The encoder according to claim 1, further comprising:
a third optical member which is disposed in an optical path between the light source section and the first optical member, changes the travelling direction of the light emitted from the light source section, and emits the first light and the second light from different positions.

3. The encoder according to claim 1, wherein
the light which is emitted from the light source section enters into the first optical member along a direction obliquely intersecting with an incidence plane direction of the first optical member.

4. The encoder according to claim 1, wherein the second optical member includes:
a first reflection member which has a reflection surface located in a direction perpendicular to an incidence plane direction of the first optical member and reflects the first light, thereby changing a travelling direction thereof; and
a second reflection member which has a reflection surface located in a direction obliquely intersecting with the incidence plane direction of the first optical member and reflects the second light, thereby changing a travelling direction thereof.

5. The encoder according to claim 1, wherein
the second optical member includes a first reflection member and a second reflection member which respectively have reflection surfaces located in a direction perpendicular to an incidence plane direction of the first optical member and respectively reflect the first light and the second light, thereby changing the travelling directions thereof, and
the second optical member further includes a transmissive member which is disposed in either the first optical path or the second optical path and between the first optical member and the diffraction grating member and has a predetermined refractive index.

6. The encoder according to claim 1, further comprising:
a compensation grating which has the same diffraction grating as that of the diffraction grating member, maintains a certain positional relationship with respect to the light source section, the first optical member, and the second optical member and is displaced relatively with respect to the diffraction grating member;
a fourth optical member which is disposed in the optical path between the second optical member and the diffraction grating member, separates each of the first and second lights received from the second optical member, emits one of the lights based on the separated first and second lights to the diffraction grating member so as to overlap each other, and emits the other light based on the separated first and second lights to the compensation grating so as to overlap each other; and
a second light receiving section which receives interfering light based on the first light and the second light from the compensation grating and detects the interference intensity of the interfering light.

7. The encoder according to claim 1, further comprising:
a compensation grating in which a third light separated from the first light and a fourth light separated from the second light enter thereto between the first optical member and the diffraction grating member; and
a second light receiving section which detects interfering light based on the third light and the fourth light.

8. The encoder according to claim 1, wherein a change in light quantity accompanying a change in wavelength of the light is compensated.

9. An encoder comprising:
a light source section which includes a modulating device and emits a light, a wavelength of which periodically changes;
an index grating, into which the light from the light source section enters and from which a first diffracted light and a second diffracted light are emitted, the index grating emitting the first diffracted light and the second diffracted light from different positions;
a transmissive member which is disposed between the light source section and the index grating in either a first optical path or a second optical path and has a predetermined refractive index;
a moving grating, into which the first diffracted light and the second diffracted light enter and which can be displaced relatively with respect to the index grating; and
a light beam receiving section which detects interfering light of the first and second diffracted lights, that is emitted from the moving grating, wherein an optical distance from the light source section to the moving grating is substantially different between the first diffracted light and the second diffracted light.

10. An encoder comprising:
a light source section which emits a light, a wavelength of which periodically changes;
an optical member that is configured to separate the light emitted from the light source section into a first light and a second light;
a moving member that is arranged to relatively move with respect to the light source section, the moving member having a diffraction grating into which the first light and the second light enter and from which a first interfering light of the first light and the second light is emitted: and
a first light receiving section which receives the first interfering light, wherein
the first light has a first optical path length and the second light has a second optical path length different from the first optical path length such that there is an optical path length difference between the first light and the second light, and
a phase difference between the first light and the second light is determined by the optical path length difference between the first light and the second light and the changes of the wavelength.

11. The encoder according to claim 10, further comprising:
a second light receiving section which receives a second interfering light that is based on a third light separated from the first light and a fourth light separated from the second light.

12. The encoder according to claim 11, further comprising:
a second optical member which separates the third light from the first light and separates the fourth light from the second light.

13. The encoder according to claim 11, further comprising:
a compensation grating into which the third light and the fourth light enters, wherein
the second light receiving section outputs a compensation signal, which is based on the second interfering light, to a compensation device.

14. The encoder according to claim 10, further comprising:
a light quantity compensation system which compensates light quantity of the light based on the first interfering light.

15. The encoder according to claim 10, wherein the light source section comprises a modulation section which periodically changes the wavelength of light.

* * * * *